(12) United States Patent
Alexander et al.

(10) Patent No.: US 9,599,350 B2
(45) Date of Patent: *Mar. 21, 2017

(54) FLAME RESISTANT FILTER APPARATUS AND METHOD

(75) Inventors: Glenn David Alexander, Dunedin (NZ); Joseph Anthony Salpietra, Jr., Shreveport, LA (US)

(73) Assignee: Ellis Fibre USA, Shreveport, LA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/565,582

(22) Filed: Sep. 23, 2009

(65) Prior Publication Data

US 2010/0071326 A1    Mar. 25, 2010

Related U.S. Application Data

(60) Provisional application No. 61/099,694, filed on Sep. 24, 2008.

(51) Int. Cl.
*B01D 46/00* (2006.01)
*F24C 15/20* (2006.01)
*B01D 39/16* (2006.01)

(52) U.S. Cl.
CPC ........ *F24C 15/2035* (2013.01); *B01D 39/163* (2013.01); *B01D 39/1615* (2013.01); *B01D 2239/0654* (2013.01); *B01D 2239/08* (2013.01)

(58) Field of Classification Search
CPC .......... B01D 1/00–2325/48; B01D 2239/0654; B01D 2239/08; B01D 39/14; B01D 39/1615; B01D 39/163; B01D 46/00; A47J 9/00–31/605; A47J 33/00–42/56; A47J 43/00–47/20; B29C 65/00; D04H 13/00; B05D 3/02; F24C 15/2035

USPC ...... 55/512–514, 522–528, DIG. 5, DIG. 36; 427/350, 389.9, 401; 156/280, 328; 210/680; 95/273–287; 126/280, 299 R, 126/300–303, 299 C, 299 D, 299 E, 299 F
See application file for complete search history.

(56) References Cited

U.S. PATENT DOCUMENTS

| | | | |
|---|---|---|---|
| 1,757,690 A * | 5/1930 | Strindberg ...................... 55/492 |
| 2,332,519 A * | 10/1943 | Leonardson et al. ......... 527/205 |
| 2,664,172 A | 12/1953 | Butterfield | |

(Continued)

FOREIGN PATENT DOCUMENTS

| DE | 89 05 0395 U1 | 6/1989 |
|---|---|---|
| GB | 572899 | 10/1945 |

(Continued)

OTHER PUBLICATIONS

Russell, S.J. "Handbook of Nonwovens," Woodhead Publishing in Textiles, 2007.*

(Continued)

*Primary Examiner* — T. Bennett McKenzie
(74) *Attorney, Agent, or Firm* — Baker Botts L.L.P.

(57) ABSTRACT

A filter assembly includes a filter pad comprising fibers including natural, synthetic and/or hybrid fibers. In particular embodiments, the filter pad comprises wool fibers. The filter assembly also includes a bonding emulsion, wherein the bonding emulsion comprises casein resin. The filter assembly also includes a structural support. In particular embodiments, at least a portion of the fibers are treated with a solution that is fire resistant or fire retardant.

18 Claims, 2 Drawing Sheets

(56) References Cited

U.S. PATENT DOCUMENTS

| | | | | |
|---|---|---|---|---|
| 2,809,715 | A * | 10/1957 | Lemkey | B01D 46/10 |
| | | | | 184/15.1 |
| 3,015,367 | A * | 1/1962 | Smith et al. | 96/135 |
| 3,158,532 | A | 11/1964 | Pall et al. | |
| 3,388,536 | A | 6/1968 | Nash | |
| 3,683,919 | A * | 8/1972 | Ells | A61F 13/15211 |
| | | | | 604/364 |
| 3,707,385 | A * | 12/1972 | Kraemer | 106/18.11 |
| 3,925,137 | A * | 12/1975 | Kamei | 156/278 |
| 4,336,038 | A * | 6/1982 | Schultheiss et al. | 96/417 |
| 4,403,446 | A * | 9/1983 | Wolfe | A01G 31/001 |
| | | | | 47/62 C |
| 4,433,020 | A * | 2/1984 | Narukawa et al. | 428/113 |
| 4,455,237 | A * | 6/1984 | Kinsley | 210/767 |
| 4,517,308 | A | 5/1985 | Ehlenz et al. | |
| 4,689,058 | A * | 8/1987 | Vogt | B01D 39/163 |
| | | | | 55/486 |
| 4,765,812 | A * | 8/1988 | Homonoff | B01D 39/1623 |
| | | | | 442/341 |
| 4,883,507 | A * | 11/1989 | Rey et al. | 95/273 |
| 4,938,234 | A * | 7/1990 | Capriotti | A61F 2/18 |
| | | | | 128/898 |
| 5,187,006 | A * | 2/1993 | Leighton | C07C 217/40 |
| | | | | 427/385.5 |
| 5,273,565 | A * | 12/1993 | Milligan et al. | 55/528 |
| 5,417,752 | A | 5/1995 | Paren et al. | |
| 5,635,005 | A * | 6/1997 | Saitoh et al. | 156/234 |
| 5,935,303 | A * | 8/1999 | Kimura | B01D 39/1615 |
| | | | | 264/441 |
| 5,972,091 | A * | 10/1999 | Giesfeldt et al. | 106/126.1 |
| 6,099,901 | A | 8/2000 | Cronia et al. | |
| 6,293,983 | B1 * | 9/2001 | More | B01D 39/1615 |
| | | | | 55/486 |
| 7,338,702 | B2 * | 3/2008 | Swales et al. | 428/294.1 |
| 2003/0017129 | A1 | 1/2003 | Maleeny et al. | |
| 2004/0096629 | A1 | 5/2004 | Aneja et al. | |
| 2004/0116026 | A1 | 6/2004 | Kubose et al. | |
| 2004/0116028 | A1 * | 6/2004 | Bryner | 442/381 |
| 2004/0121114 | A1 * | 6/2004 | Piana et al. | 428/85 |
| 2006/0042020 | A1 * | 3/2006 | Salmon et al. | 8/115.51 |
| 2006/0286884 | A1 | 12/2006 | Thioliere et al. | |
| 2007/0084786 | A1 * | 4/2007 | Smithies | 210/490 |
| 2007/0207533 | A1 * | 9/2007 | Callahan | B08B 7/00 |
| | | | | 435/262.5 |
| 2007/0245703 | A1 | 10/2007 | Randinelli et al. | |
| 2008/0022645 | A1 | 1/2008 | Skirius et al. | |
| 2009/0030131 | A1 * | 1/2009 | Fushitani | D01F 2/10 |
| | | | | 524/456 |

FOREIGN PATENT DOCUMENTS

| | | | | |
|---|---|---|---|---|
| GB | 818943 | A | 8/1959 | |
| GB | 822 175 | A | 10/1959 | |
| GB | 1 401 231 | A | 7/1975 | |
| GB | 2290727 | A | 1/1996 | |
| JP | WO 2007023777 | A1 * | 3/2007 | D01F 2/10 |
| WO | 98/45021 | A1 | 10/1998 | |
| WO | WO2007023777 | A1 * | 3/2007 | |
| WO | 2007/140302 | A2 | 12/2007 | |
| WO | 2008/103736 | A1 | 8/2008 | |

OTHER PUBLICATIONS

Russell, S.J., "Handbook of Nonwovens," Woodhead Publishing in Textiles, 2007.*

Russell, S.J., Handbook of Nonwovens, Woodhead Publishing in Textiles, 2007.*

Notification of Transmittal of the International Search Report and the Written Opinion of the International Searching Authority, or the Declaration; International Application : PCT/US2009/058186; International Filing Date Sep. 24, 2009.

European Patent Office, Notification of Transmittal of the International Search Report and the Written Opinion of the International Searching Authority, or the Declaration for International Application No. PCT/US2009/057994, mailed Jul. 14, 2010.

Intellectual Property Office of New Zealand, Examination Report for New Zealand Patent Application No. 591766, dated Mar. 27, 2012.

European Patent Office, Notification of Transmittal of the International Search Report and the Written Opinion of the International Searching Authority, or the Declaration for International Application No. PCT/US2009/058183, mailed Feb. 5, 2010.

* cited by examiner

FLAME RESISTANT FILTER APPARATUS AND METHOD

RELATED APPLICATIONS

This application claims the benefit of U.S. Provisional Application No. 61/099,694, filed Sep. 24, 2008, which is incorporated herein by reference.

TECHNICAL FIELD OF THE DISCLOSURE

The teachings of the present disclosure relate generally to exhaust filtration in ventilation systems, and more particularly to a flame resistant filter apparatus and method.

BACKGROUND OF THE INVENTION

The exhaust units used in food preparation and commercial kitchens include devices such as air extractor hoods and air conditioning units. The traditional exhaust systems include filter elements that use a variety of metal or flame listed baffles, as identified in the various U.S. or State Codes, for the purpose of blocking flames from penetrating the exhaust system and diverting grease from building up in the ductwork of the exhaust system.

The exhausted air in the food preparation environment is typically laden with greasy vapor and unwanted odors and substances. The grease and unwanted substances should be trapped by the filters before passing through to the ducting to be released to the environment. Grease may collect on ductwork or pass into the environment. In addition, the grease and others substances contaminate the hood and fan and these require constant cleaning to remove the grease. As the filters get quickly filled with grease they require regular cleaning. Moreover, the grease in the ducting constitutes a major fire hazard as ducting fires are a constant concern.

SUMMARY OF THE INVENTION

The present disclosure provides a flame resistant exhaust filter apparatus, system and method that substantially eliminates or reduces at least some of the disadvantages and problems associated with previous exhaust filtration system and methods.

In accordance with one embodiment of the present disclosure, a filter assembly comprises a filter pad comprising fibers selected from the group consisting of natural fibers, synthetic fibers, and hybrid fibers. In particular embodiments, the filter pad comprises wool fibers. The filter pad may also comprise wool fibers and synthetic fibers. The filter assembly may also comprise a bonding emulsion, wherein the bonding emulsion comprises casein resin. In particular embodiments, the bonding emulsion further comprises acrylic resin. In other particular embodiments, the bonding emulsion further comprises starch and protein. In other particular embodiments, the bonding emulsion further comprises protein. In other particular embodiments, the bonding emulsion further comprises polylactic acid. The filter assembly also includes a structural support.

In accordance with another embodiment of the present disclosure, a method of manufacturing a filter assembly comprises forming a filter pad comprising fibers selected from the group consisting of natural fibers, synthetic fibers, and hybrid fibers. In particular embodiments, the filter pad comprises wool fibers. The filter pad may also comprise wool fibers and synthetic fibers. The method of manufacturing a filter assembly may also comprise applying a bonding emulsion to the fibers, wherein the bonding emulsion comprises casein resin. In particular embodiments, the bonding emulsion further comprises acrylic resin. In other particular embodiments, the bonding emulsion further comprises starch and protein. In other particular embodiments, the bonding emulsion further comprises protein. In other particular embodiments, the bonding emulsion further comprises polylactic acid. The method of manufacturing a filter assembly also includes a structural support.

In accordance with yet another embodiment of the present disclosure, a method of manufacture includes carding wool fibers into a fiber web. The method further includes needle punching the fiber web into a non-woven blanket. In addition, the method further includes applying a bonding emulsion to the wool fibers, wherein the bonding emulsion comprises casein.

Technical advantages of particular embodiments of the present disclosure include efficiently removing or reducing grease particulates from grease-laden vapor or air emanating from kitchen equipment. Accordingly, baffle filters and connecting ductwork may remain cleaner for a longer period of time, thereby being an even more effective fire barrier since the fuel source (e.g., grease particulates) has been decreased from the airflow prior to reaching any baffle filters and/or ductwork.

Technical advantages of particular embodiments of the present disclosure also include the ability to easily remove and replace a grease-saturated filter assembly, eliminating the need for costly and time-consuming cleaning of traditional baffle filters. Consequently, particular embodiments of the present invention provide a disposable and replaceable filters for grease-laden vapor and air emanating from kitchen equipment. Additionally, the filter assembly may be biodegradable, allowing for safe, ecologically-friendly, and cost-effective disposal of used filter assemblies.

Other technical advantages of particular embodiments of the present disclosure include reducing the likelihood of damaging fires caused by flames interacting with grease build-up in traditional filters. In particular embodiments, a fire-resistant or fire-retardant chemical may be applied to a filter assembly. Thus, the likelihood of flames or excessive heat buildup causing a conflagration in a filter assembly may be substantially reduced or eliminated altogether.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
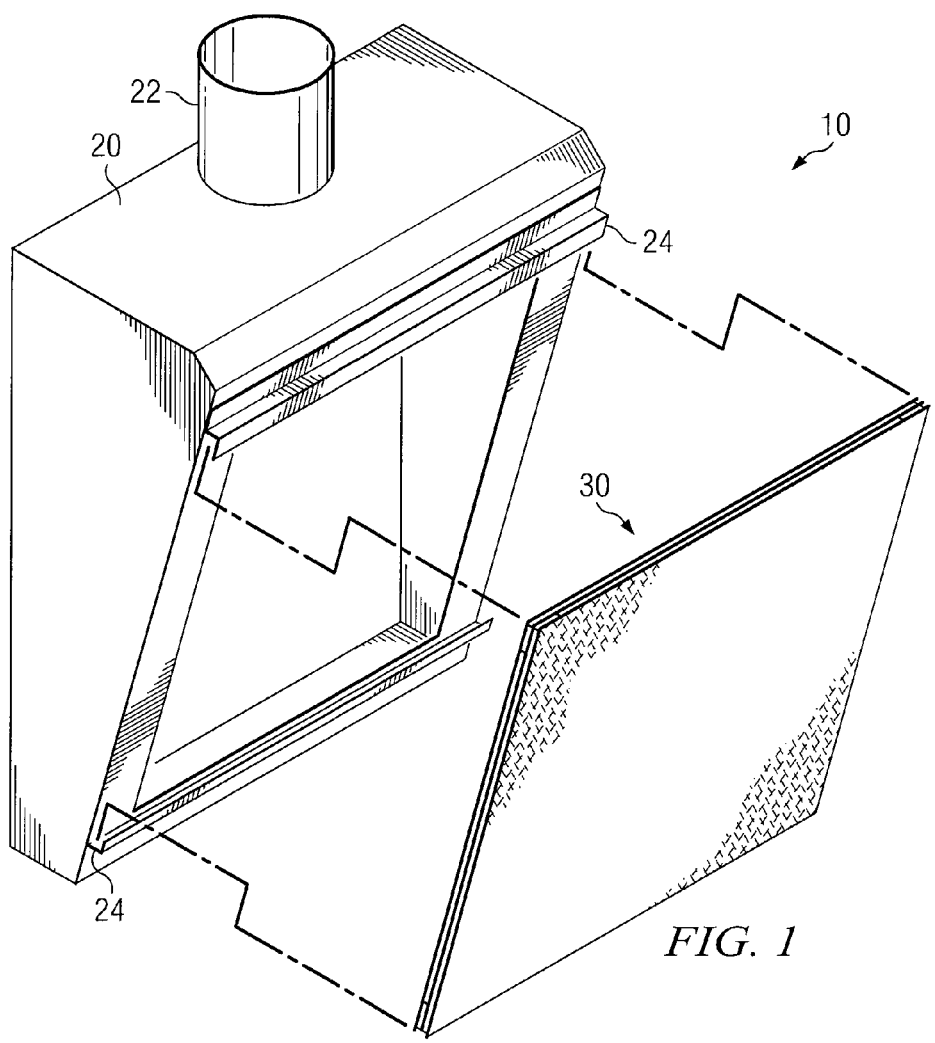
FIG. 1 illustrates an exhaust filtration system, including a vent hood and a fire resistant filter.

FIG. 1 illustrates a particular embodiment of an exhaust filtration system 10. Exhaust filtration system 10 may include vent hood 20, and filter assembly 30. To filter grease, vapor and other particulates arising from kitchen equipment, filter assembly 30 may be mounted in vent hood 30. In particular embodiments, filter assembly 30 may be formed of materials such that it is generally "self-supporting," meaning that it does not require metal filter support frames, frame covers or heat shields. Filter assembly 30 can be formed in a variety of ways using a variety of materials that may result in a filter assembly 30 that is either reusable or disposable. In such embodiments, filter assembly 30 can be easily mounted, as discussed further below, in vent hood 20 by simply sliding it into place on brackets or some other similar fastening or support system within vent hood 20.

Vent hood 20 may represent any ventilation equipment designed or configured to exhaust heat, odors, grease, vapor, grease-laden vapor, and/or other particulates away from kitchen equipment. For example, in particular embodiments, vent hood 20 may be positioned in proximity to a fryer, grill, griddle, or oven, whether in a home or commercial setting. In particular embodiments, vent hood 20 may be positioned above the relevant kitchen equipment, so that naturally rising heat and vapor passes through or is sucked into vent hood 20 and filter assembly 30. Mounting brackets 24 may also be provided as part of vent hood 20. For purposes of this disclosure, "mounting brackets" may refer to clips, brackets, grooves, clasps, and/or any other type of holding mechanism to hold or secure filter assembly 30 within or on a portion of vent hood 20. Mounting brackets 24 may be formed of practically any material that will support the weight of filter assembly 30 and hold filter assembly 30 in place within the exhaust hood. In accordance with a particular embodiment of the present disclosure, to meet various codes and regulations governing exhaust hoods, the mounting brackets may be comprised of stainless steel and/or another non-combustible material. Mounting brackets 24 may be designed to practically any shape to hold filter assembly 30 in place and maintain a sufficient seal within the vent hood 20 aperture. In particular embodiments of the present disclosure, mounting brackets 24 may be made of stainless steel and formed into the shape of "Z" or "U" to hold filter assembly 30 in place, and allow for simplified removal and/or replacement of filter assembly 30.

Vent hood 20 may additionally include one or more baffle filters (not shown in FIG. 1), which may be configured with a series of overlapping baffles. The overlapping baffles may force the grease-laden exhaust vapor to make several changes in direction within the grease filter. The grease is dismissed from the air stream by centrifugal force and accumulates within the baffle interior. In particular embodiments, filter assembly 30 may be positioned in front of one or more baffle filters, such that grease-laded vapor or exhaust air is first filtered by filter assembly 30 before passing through one or more baffle filters. In general, however, filter assembly 30 and one or more baffle filters may be disposed or positioned in any appropriate relative arrangement, including any adjacent, conjunctive or separated arrangement. Vent hood 20 may additionally include exhaust conduit 22, which may connect components of vent hood 20 to ductwork that transports filtered exhaust air to other portions of a ventilation system. In particular embodiments, the filtered air may be carried through exhaust conduit 22 to ductwork that ultimately transports the filtered exhaust air to the outside environment. In other particular embodiments, the filtered exhaust air may be carried through exhaust conduit 22 and released into the immediate interior kitchen environment. Particular embodiments of vent hood 20 may include one or more fan assemblies that create pressure to facilitate the movement of air and/or vapor into filter assembly 30 and through exhaust conduit 22.

Filter assembly 30 is positioned or disposed within or on vent hood 20, and filters heat, odors, grease, vapor, grease-laden vapor, and/or other particulates or contaminants emanating from kitchen equipment. As discussed further below with respect to FIG. 2, filter assembly 30 may be at least partially constructed of bio-degradable wool fiber and a bonding emulsion blend to which a fire retardant solution may be applied. Filter assembly 30 may be removably coupled to vent hood 20 by mounting brackets 24, or by clips, brackets, grooves, clasps, and/or any other type of holding mechanism. Thus, as a first filter assembly 30 becomes partially or fully saturated with grease, vapor, and/or other particulates, the first filter assembly 30 may be loosened and removed from one or more holding mechanisms, and a second clean or unused filter assembly 30 may be removably coupled to vent hood 20 with the holding mechanism. Consequently, filter assembly 30 may be disposable and interchangeable with other filter assemblies 30. Moreover, a particular vent hood 20 may accommodate or support a plurality of filter assemblies 30. A plurality of filter assemblies 30 may be placed or disposed in vent hood 20 in any appropriate arrangement, including, but not limited to, side by side, separated, or "back to back," such that a given volume of air or grease-laden vapor flows through each filter assembly 30.

Figure 2:
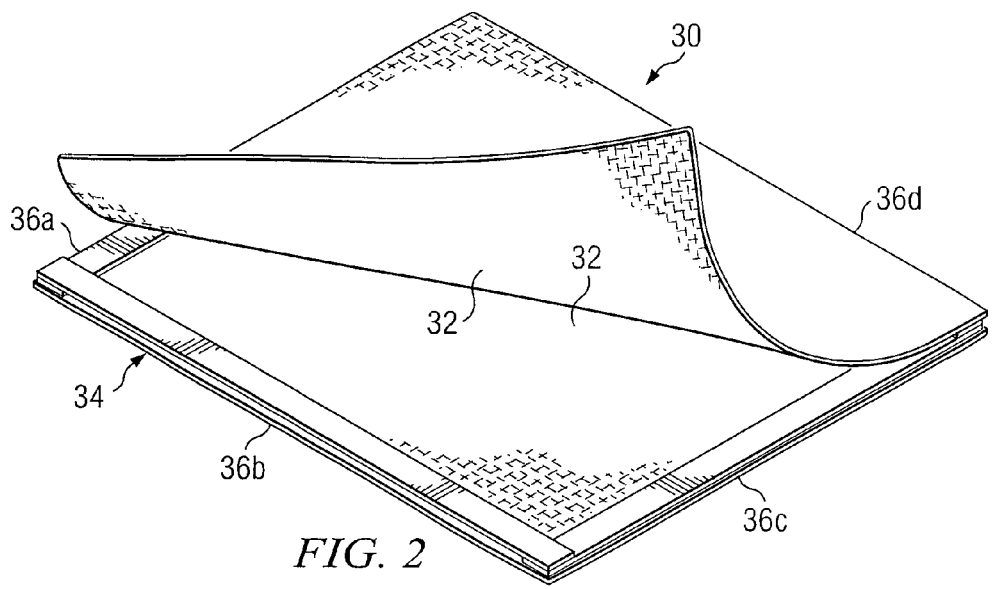
FIG. 2 illustrates the fire resistant filter of FIG. 1 in more detail, including aspects of an embodiment of the present disclosure.

FIG. 2 illustrates in greater detail filter assembly 30 as shown in FIG. 1. As noted above with respect to FIG. 1, filter assembly 30 may be positioned or disposed within or on vent hood 20, and filters heat, odors, grease, vapor, grease-laden vapor, and/or other particulates or contaminants emanating from kitchen equipment. To facilitate positioning within vent hood 20 in order to capture and/or remove grease or vapor from exhaust air, particular embodiments of filter assembly 30 may include filter pad 32 and support structure 34. In particular embodiments, filter pad 32 may facilitate the capture and removal of grease, grease-laden vapor, and other particulates from the air. For example, filter pad 32 may be formed from fibers that are capable of collecting and/or holding grease particulates from air that travels through the filter pad 32. In particular embodiments, the filter pad 32 may be formed from wool or other fibers bonded together with a bonding emulsion that may contain additional additives such as fire retardant, fire suppressant, anti-microbial, anti-bacterial, color dyes, etc. As shown in FIG. 2, filter assembly 30 may include two filter pads 32 couple to support structure 34. In general, however, filter assembly 30 may include any appropriate number of filter pads 32, depending on the operating conditions of exhaust filtration system 10.

Because wool is naturally oleophilic, wool fiber has the ability to at least partially capture and/or remove grease from grease-laden vapor or air emanating from kitchen equipment. Accordingly, at least a portion of or substantially all of the grease or other particulates are captured at filter assembly 30 by filter pad 32 before the remaining air passes through a baffle filter and/or exhaust conduit 22. Particular embodiments of filter assembly 32 may include fibers other than wool. For example, filter assembly 30 may be manufactured using one or more (e.g., a blend) of various fibers. For example, at least three different types of fibers may be used: (i) natural fibers, (ii) synthetic fibers, and/or (iii) hybrid fibers. For the purposes of this disclosure, "natural" fibers generally refers to fibers that are derived from nature and include wool (e.g., sheep's wool or any other animal hair), cotton, linen, hemp, manila, flax, plant fibers, jute sisal, etc. For the purposes of this disclosure, "synthetic" fibers generally refers to fibers that are man-made, and include nylon, polyester, acrylic, polypropylene, polyethylene, polystyrene, flame resistant modified acrylic, etc. For the purposes of this disclosure, "hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. At least some of the above referenced fibers may also be used in a flame resistant form in which a flame resistant additive is impregnated into the fibers. Additionally, filter assembly 30 may be manufactured using any of the natural, synthetic, or hybrid fibers alone, or in combination with one or more other fibers.

The bonding emulsion used in conjunction with wool fibers may be configured according to the particular environment in which the exhaust filtration system 10 is installed, or the needs of the overall ventilation system. In particular embodiments, the bonding emulsion may comprise a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers to bonding emulsion may vary depending on the particular bonding emulsion used, the environment in which exhaust filtration system 10 operates, and/or any other considerations, factors, or variables. In particular embodiments, filter pad 32 may include up to 90% scoured wool and 10% bonding emulsion. In general, the various acrylic resin, casein resin, starch, protein, and polylactic acid substances may be inter-mixed and blended with each other in any appropriate combination and in any appropriate proportions.

In particular embodiments, the bonding emulsion may be designed so that it will break down over time when the filter is disposed of after use (i.e., is biodegradable). One or more of the fibers, including, but not limited to wool fibers, may also be biodegradable. While this bonding solution may be made from acrylic co-polymers and casein, it could also be made with other natural occurring and biodegradable (or other) binders which are also biodegradable such as starch and protein adhesives. Synthetic bonding components which have biodegradable properties including, but not limited to, polylactic acid (PLA), may also be used. Hydrogen-bonding may also be used in the manufacture and/or assembly of filter assembly 30 as it used to bind certain cellulose non-woven materials. Thus, the filter assembly 30 may be designed to be fully biodegradable and, as such, can be easily disposed of while minimally affecting the environment.

Additionally, in particular embodiments, a flame retardant solution may be applied to the wool fibers, the bonding emulsion, or the wool fibers and bonding emulsion blend, to provide resistance to flames, fire, or heat. While wool is naturally flame resistant, in a configuration in accordance with the teachings of this disclosure, wool fibers may be exposed to higher concentrations of oxygen from the air, making combustion a possibility in certain conditions. Thus, a flame retardant may be applied to prevent or reduce combustion, charring, or other deleterious consequences of interactions with fire. For example, in embodiments of exhaust filtration system 10 in which vent hood 20 and filter assembly 30 are positioned over an open flame, or positioned in an area where flames may occur, the flame retardant solution may provide filter assembly 30 with more resistance to flames or fire than would be the case if a fire retardant solution were not applied to filter assembly 30. Flame resistant properties of filter assembly 30 may be particularly useful in embodiments of exhaust filtration system 10 associated with a grill, griddle, fryer and/or oven. Additionally, the filter may also act as a flame barrier to other components of vent hood 32, such as exhaust conduit 22 and associated ductwork.

Support structure 34 is designed to add structure and rigidity to filter assembly 30. In particular embodiments, support structure 34 may include four sides 36 (top 36a, bottom 36b, left 36c and right 36d). In other particular embodiments, support structure 34 may have fewer or additional sides. In other particular embodiments, support structure 34 may be rounded or oblong to support a rounded or oblong filter assembly 30. Additionally, support structure 34 may be made of practically any material. For example, support structure 34 may be made of a natural, bio-degradable material that is lightweight and flame-resistant. Support structure 32 could be made of practically any material that will pass any required regulatory codes. Support structure 34 may also include any number of horizontal, vertical and/or diagonal supports of practically any size or configuration. Functionally, it is beneficial for support structure 34 to add shape and structure to filter assembly 30 with relatively little added weight and/or very little added static pressure. Thus, structural support may be made of any light-weight, structurally sound biodegradable material. In particular embodiments, support structure 34 may represent a box frame disposed between two or more filter pads 32. In such embodiments, the particular filter pads 32 may be held together with a heat-resistant glue. One or more sides of support structure 34 may be coated with a heat-resistant glue which results in the components being held firmly together when pressure is applied to the unit to compress the assembly. In other embodiments, support structure 34 may represent a frame that surrounds one or more filter pads 32, which are held within one or more grooves or slots in sides 36a, 36b, 36c, and/or 36d. In other embodiments, support structure 34 may represent a stainless steel frame with one or more teeth extending from the surface of one of the sides of support structure 34. In such embodiments, filter pad 32 may overlap the edges of support structure 34 where the teeth of support structure grip and hold on to filter pad 32. In general, filter assembly 30 may comprise any appropriate number of filter pads 32 arranged on or coupled to support structure 34.

In accordance with particular embodiments of the present disclosure, filter assembly 30 may vary in weight from 55 grams/square meter to 500 grams/square meter ("gsm"). Particular embodiments of filter assembly 30 may weigh from 225-500 gsm. Other particular embodiments of filter assembly may weigh from 300-450 gsm. For purposes of this disclosure, grams/square meter may refer to a dry mass weight. Additionally, filter assembly 30 may have a loft of approximately 5 mm to 50 mm, depending on the loft of the natural wool used, as this imparts loft and resilience to compression as part of its natural characteristics. The volume of air flowing through filter assembly 30 contributes to the efficient and effective use of the filter. The wool imparts loft and openness to the structure which allows sufficient air to pass through during operation. Although the materials, substances, methods, processes, and solutions have been described herein in connection with operation in an exhaust filtration system, some or all of the materials, substances, and solutions may additionally provide benefits in connection with insulation. For example, particular embodiments of the present disclosure may provide benefits in insulating appliances, homes, or any other device or structure where it is desirable to provide heat or flame resistance. In such embodiments, the loft and/or densities of filter pad 32 may be substantially higher, because there may be no need for any airflow.

A particular method that may be used to manufacture filter assembly 30 in accordance with a particular embodiment of the present disclosure is now described. Scoured wool may be opened to enable easier processing, then put through a non woven carding machine which further opens and aligns the wool fibers. The card makes the wool into wool web which is then layered using a cross lapping machine into a wool wadding. The lapping and carding is helpful to ensure the wool fibers are aligned correctly so that when the wool wadding is sprayed with binder that the final filter will have sufficient loft and height. In particular embodiments, the wool filter could be also needle punched into a non-woven blanket. Other non-woven processes, such as needling, thermo bonding, air laid, spun bond and/or other non-woven technology could be used to form the wadding/blanket in other embodiments.

At this stage a bonding emulsion or flame retardant compound may be applied by spraying the top and the bottom of the wadding with a spray mix. The bonding emulsion or flame retardant compound may be applied in a diluted form to allow penetration through the wadding. As the thickness of the wadding and grams per square meter can vary the amount of bonding emulsion will also vary, so that it matches what is required to sufficiently bond the filter blanket and impart the desired physical properties.

In addition, the bonding emulsion may include an antimicrobial and antibacterial agent added to it as well as an approved dye to dye the filter to the desired color. In particular embodiments, a vacuum positioned in proximity to the filter may provide unidirectional pressure to assist the bonding emulsion, flame retardant compound, antimicrobial agent and/or antibacterial agent in penetrating the wadding.

The spray bonded wadding may then be passed through an oven that has an internal ambient temperature of approximately between 280 and 305 degrees Fahrenheit to drive off the water and cure the bonding resins.

The resultant wadding may then be rolled into rolls and allowed 24 hours to fully cure and the binder to be fully effective. During this time the wool absorbs moisture from the atmosphere.

The resultant wadding may then be made into rolls cut at specific widths. These rolls are then cut into the filter panels and press packed into packages of, for example, 24 filters. The resulting filter may be supplied in either rolls or cut panels depending on the installation requirements. The most common method would be to fix the wool filter into a stainless steel frame which can be installed above the vent. The frame assembly also has a front cover to support the filter. In addition where there is excessive heat and flame a shield may be placed over the filter frame assembly.

Figure 3:
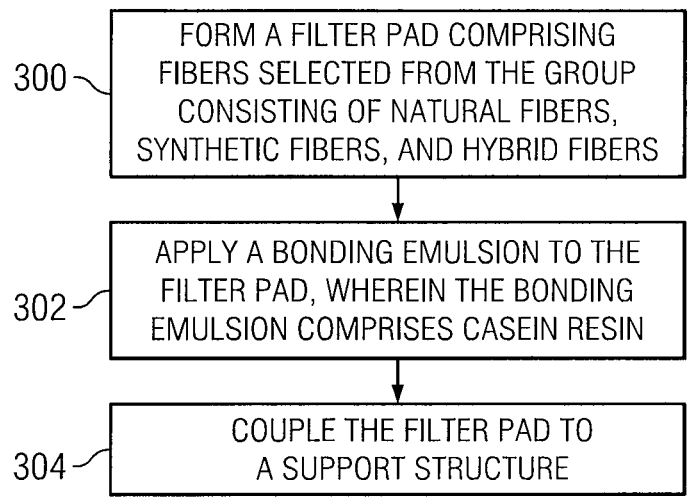
FIG. 3 is a flow chart illustrating a method of manufacturing a particular embodiment of the fire resistant filter of FIG. 2.

FIG. 3 is a flowchart illustrating a method of manufacturing the filter assembly 30 illustrated in FIG. 2. Operation, in the illustrated example, begins at step 300, in which a filter pad comprising fibers selected from the group consisting of natural fibers, synthetic fibers, and hybrid fibers is formed. As described above with respect to FIG. 2, at least three different types of fibers may be used in forming a filter pad: (i) natural fibers, (ii) synthetic fibers, and/or (iii) hybrid fibers. As discussed above, "natural" fibers generally refers to fibers that are derived from nature and include wool (e.g., sheep's wool or any other animal hair), cotton, linen, hemp, manila, flax, plant fibers, jute sisal, etc. "Synthetic" fibers generally refers to fibers that are man-made, and include nylon, polyester, acrylic, polypropylene, polyethylene, polystyrene, flame resistant modified acrylic, etc. "Hybrid" fibers generally refers to fibers that are derived from nature but materially modified by man, and include viscose, rayon, PLA, PLA flame resistant polymers, biodegradable flame resistant polymers, flame resistant rayon, synthetic fiber derived from a natural source, fibers that are derived from corn starch, etc. Most of the above referenced fibers may also be used in a flame resistant form in which a flame resistant additive is impregnated into the fibers. Additionally, a filter pad may be formed using any of the natural, synthetic, or hybrid fibers alone, or in combination with one or more other fibers.

At step 302 a bonding emulsion, wherein the bonding emulsion comprises casein resin, is applied to the fibers. Although step 302 describes a particular embodiment of manufacturing filter assembly 30 in which casein resin is applied to the fibers, in particular embodiments, the bonding emulsion may comprise a blend of one or more natural or synthetic bonding substances. For example, the bonding emulsion may comprise an acrylic resin and casein resin blend. The bonding emulsion may also comprise a starch and protein blend. The bonding emulsion may also comprise a protein and casein resin blend. The bonding emulsion may also comprise a casein and polylactic acid (PLA) blend. The proportion of wool fibers to bonding emulsion may vary depending on the particular bonding emulsion used, the environment in which exhaust filtration system 10 operates, and/or any other considerations, factors, or variables. In general, the various acrylic resin, casein resin, starch, protein, and polylactic acid substances may be inter-mixed and blended with each other in any appropriate combination and in any appropriate proportions, and applied to the fibers.

At step 304 the filter pad is coupled to a support structure. As described above with respect to FIG. 2, support structure 34 is designed to add structure and rigidity to filter assembly 30. Support structure 34 may comprise any appropriate lightweight, flame-resistant biodegradable material suitable to add structure to filter assembly 30. Additionally, support structure 34 may be shaped into any appropriate form suitable to perform the described functions, including rectangular, square, round, or any other multi-sided shape. Support structure 34 may also include any number of horizontal, vertical and/or diagonal supports of practically any size or configuration.

In particular embodiments, support structure 34 may represent a box frame disposed between one or more filter pads 32. In such embodiments, the particular filter pads 32 may be held together with a heat-resistant glue. Both sides of support structure 34 may be coated with a heat-resistant glue which results in the components being held firmly together when pressure is applied to the unit to compress filter assembly 30. In other embodiments, support structure 34 may represent a frame that surrounds one or more filter pads 32, which are held within one or more grooves or slots in sides 36a, 36b, 36c, and/or 36d, or are held between glued edges of support structure 34.

The steps illustrated in FIG. 3 may be combined, modified, or deleted where appropriate, and additional steps may also be added to those shown. Additionally, the steps may be performed in any suitable order without departing from the scope of the present disclosure.

Figure 4:
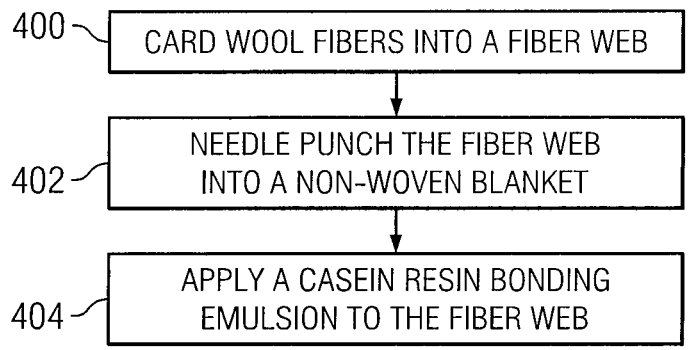
FIG. 4 is a flow chart illustrating a method of manufacture in accordance with a particular embodiment of the present disclosure.

FIG. 4 is a flowchart illustrating a particular method of manufacture in accordance with a particular embodiment of the present disclosure. Operation, in the illustrated example, begins at step 400, with wool fibers being carded into a fiber web. As discussed above, scoured wool may be opened to enable easier processing, then put through a non woven carding machine which further opens and aligns the wool fibers. The card makes the wool into wool web which is then layered using a cross lapping machine into a wool wadding. The lapping and carding is helpful to ensure the wool fibers are aligned correctly so that when the wool wadding is sprayed with binder that the final filter will have sufficient loft and height.

In step 402, the fiber web is needle punched into a non-woven blanket. Other non-woven processes, such as needling, thermo bonding, air laid, spun bond and/or other non-woven technology could be used to form the wadding/blanket in other embodiments.

In step 404, a bonding emulsion is applied to the fiber web. In particular embodiments, the top and the bottom of the fiber web may be sprayed with a blend of bonding emulsion and flame retardant. In particular embodiments, the bonding emulsion may comprise casein resin. The bonding emulsion may also comprise, alone or in combination, acrylic resin, starch and protein, protein and/or polylactic acid. Additionally, the bonding emulsion or flame retardant compound may be applied in a diluted form to allow penetration through the wadding. As the thickness of the wadding and grams per square meter can vary the amount of bonding emulsion will also vary, so that it matches what is required to sufficiently bond the filter blanket and impart the desired physical properties. In addition, the bonding emulsion may include an antimicrobial and antibacterial agent added to it as well as an approved dye to dye the filter to the desired color. In particular embodiments, a vacuum positioned in proximity to the filter may provide unidirectional pressure to assist the bonding emulsion, flame retardant compound, antimicrobial agent and/or antibacterial agent in penetrating the wadding. The spray bonded wadding may then be passed through an oven that has an internal ambient temperature of approximately between 280 and 305 degrees Fahrenheit to drive off the water and cure the bonding resins.

The steps illustrated in FIG. 4 may be combined, modified, or deleted where appropriate, and additional steps may also be added to those shown. Additionally, the steps may be performed in any suitable order without departing from the scope of the present disclosure.

The present disclosure is generally directed to a removable and/or disposable filter assembly that is placed between the cooking surface and the baffle filters disposed within a vent hood described herein, to capture grease and/or other particulates from grease laden vapors prior to entry into, or "upstream" from the baffle filters described herein.

Although an embodiment of the disclosure has been described using specific terms, such description is for illustrative purposes only. The words used are words of description rather than of limitation. It is to be understood that numerous changes, substitutions, variations, alterations, transformations, and modifications may be made by those of ordinary skill in the art without departing from the spirit and scope of the present disclosure, which is set forth in the following claims. Therefore, the spirit and scope of the appended claims should not be limited to the description of the embodiments disclosed therein.

What is claimed is:

1. A kitchen vent hood filter assembly, the filter assembly comprising:
   a filter pad comprising oleophilic fibers, such that the filter pad is an oleophilic filter pad, formed through at least one of thermo-bonding, air-laid, and spunbond, associated with an exhaust ventilation system, the oleophilic filter pad comprising viscose fibers and wool fibers;
   a biodegradable bonding emulsion comprising casein resin and polylactic acid (PLA);
   a fire retardant solution; and
   a structural support that holds the filter pad in place within a vent hood without metal filter support frames, frame covers or heat shields.

2. The filter assembly of claim 1, wherein the oleophilic filter pad comprises rayon fibers.

3. The filter assembly of claim 1, wherein the oleophilic filter pad comprises nylon fibers.

4. The filter assembly of claim 1, wherein the structural support comprises a stabilizer frame embedded in the filter pad, and the stabilizer frame comprises a box frame.

5. The filter assembly of claim 1, wherein the structural support comprises supports extending between opposite sides of the filter pad.

6. The filter assembly of claim 1, wherein the structural support comprises four sides to form a rectangle.

7. The filter assembly of claim 1, wherein the oleophilic fiber pad comprises no more than 90% wool fibers.

8. The filter assembly of claim 1, wherein the filter assembly has a total dry weight approximately between 55 grams per square meter to 500 grams per square meter.

9. The filter assembly of claim 8, wherein the filter assembly has a dry loft of approximately between 5 mm and 50 mm.

10. A method of manufacturing a kitchen vent hood filter assembly, the method comprising:
    forming a filter pad comprising oleophilic fibers, such that the filter pad is an oleophilic filter pad, formed through at least one of thermo-bonding, air-laid, and spunbond, associated with an exhaust filtration system, the oleophilic filter pad comprising viscose fibers and wool fibers;
    applying a biodegradable bonding emulsion to the oleophilic filter pad, wherein the bonding emulsion comprises casein resin and polylactic acid (PLA);
    applying a fire retardant solution to the oleophilic filter pad; and
    coupling the filter pad to a structural support that holds the filter pad in place within a vent hood without metal filter support frames, frame covers or heat shields.

11. The method of claim 10, wherein the oleophilic filter pad comprises rayon fibers.

12. The method of claim 10, wherein the oleophilic filter pad comprises nylon fibers.

13. The method of claim 10, wherein the structural support comprises a stabilizer frame embedded in the filter pad, and the stabilizer frame comprises a box frame.

14. The method of claim 13, wherein the structural support comprises supports extending between opposite sides of the filter pad.

15. The method of claim 10, wherein the structural support comprises four sides to form a rectangle.

16. The method of claim 10, the oleophilic fiber pad comprises no more than 90% wool fibers.

17. The method of claim 16, wherein the filter assembly has a total dry weight approximately between 55 grams per square meter to 500 grams per square meter.

18. The method of claim 17, wherein the filter assembly has a dry loft approximately between 5 mm and 50 mm.

* * * * *